United States Patent [19]

Ouellette

[11] 4,308,946
[45] Jan. 5, 1982

[54] CONVERTIBLE CONVEYOR

[75] Inventor: Joseph F. Ouellette, Glendale, Mo.

[73] Assignee: Ouellette Machinery Systems, Inc., Fenton, Mo.

[21] Appl. No.: 972,915

[22] Filed: Dec. 26, 1978

[51] Int. Cl.³ .............................................. B65G 13/07
[52] U.S. Cl. ................................. 198/790; 198/814; 198/843
[58] Field of Search ............... 198/335, 336, 287, 790, 198/798, 814, 843, 780; 113/35 R

[56] References Cited

U.S. PATENT DOCUMENTS

| | | | |
|---|---|---|---|
| 1,708,854 | 4/1929 | Stahlhut | 193/35 R |
| 3,344,903 | 10/1967 | Holm | 198/790 |
| 3,563,365 | 2/1971 | Loberg | 198/790 |
| 3,724,643 | 4/1973 | Kohl | 198/790 X |
| 4,117,923 | 10/1978 | Werntz | 198/790 |

FOREIGN PATENT DOCUMENTS 1393672  5/1975  United Kingdom ............... 198/814

*Primary Examiner*—Robert B. Reeves
*Assistant Examiner*—Douglas D. Watts
*Attorney, Agent, or Firm*—Rogers, Eilers & Howell

[57] ABSTRACT

A gravity roller conveyor has a pair of side frames, a plurality of rollers rotatably mounted between the side frames, with provisions for conveniently converting the conveyor to a power roller conveyor including a mounting plate to receive a motor, a center bracket disposed between the side frames to receive and mount a drive shaft and end pulley at each end of the conveyor, provision for mounting a plurality of guide pulleys between the end pulleys, and a belt tightener so that an endless belt may be looped around the pulleys and tightened in place. A center spine may be provided extending the length of the conveyor to strengthen it and minimize the size of the side frames. The guide pulley mount includes a tee bar extending between the side frames with a cross bar mounted to the leg of the tee. A tension adjustment includes a tension spring and nut which threads on the leg to compress the spring against the cross bar and urge the guide pulleys mounted on the cross bar against the drive belt. The tee bar and cross bar may be canted for curved sections of conveyors which permits their use with standard tapered rollers. A belt tightener includes a slide bracket which is releasably secured to a guide bracket and a pulley mounted at an end of the slide bracket to engage the drive belt to take up slack.

14 Claims, 14 Drawing Figures

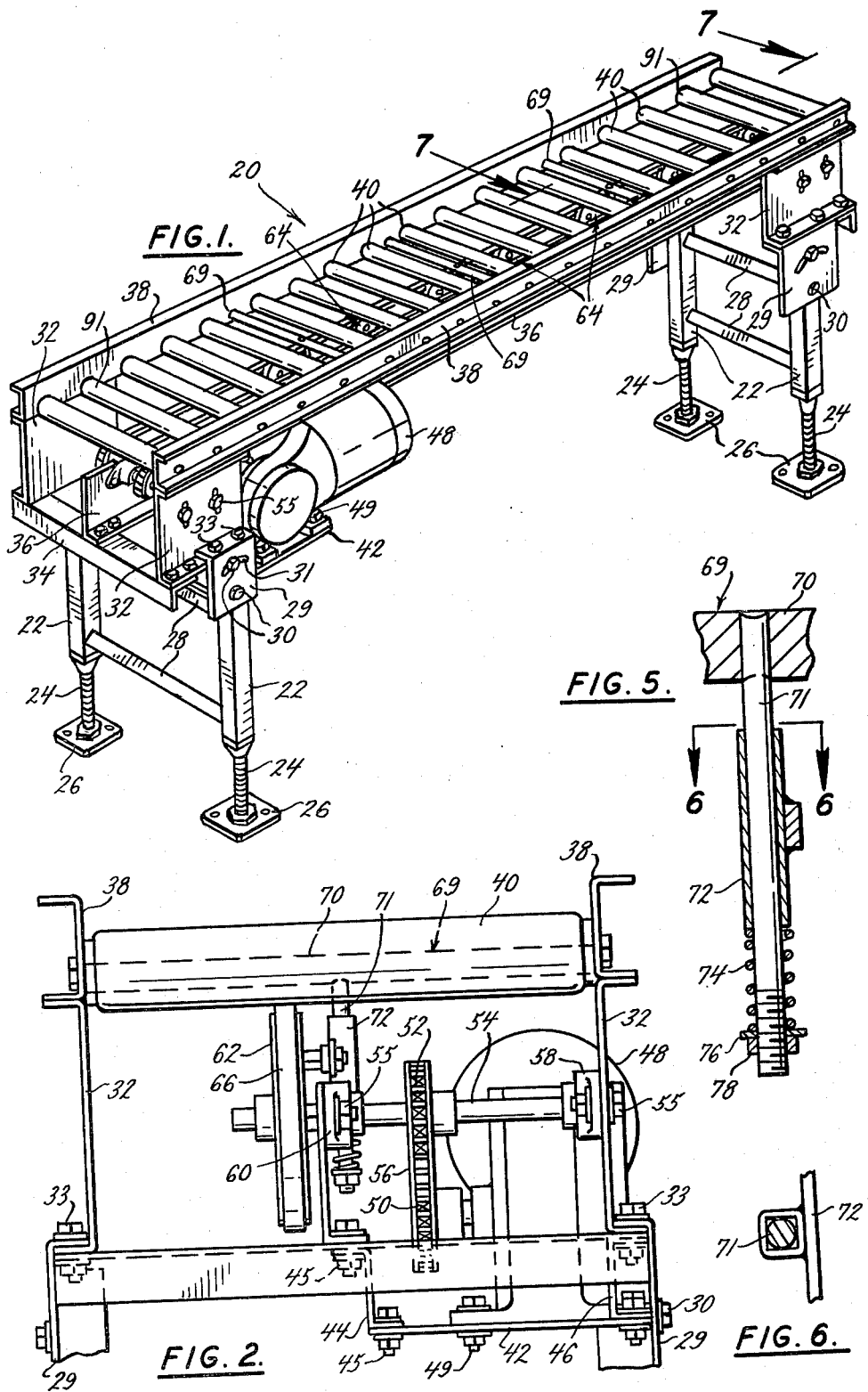

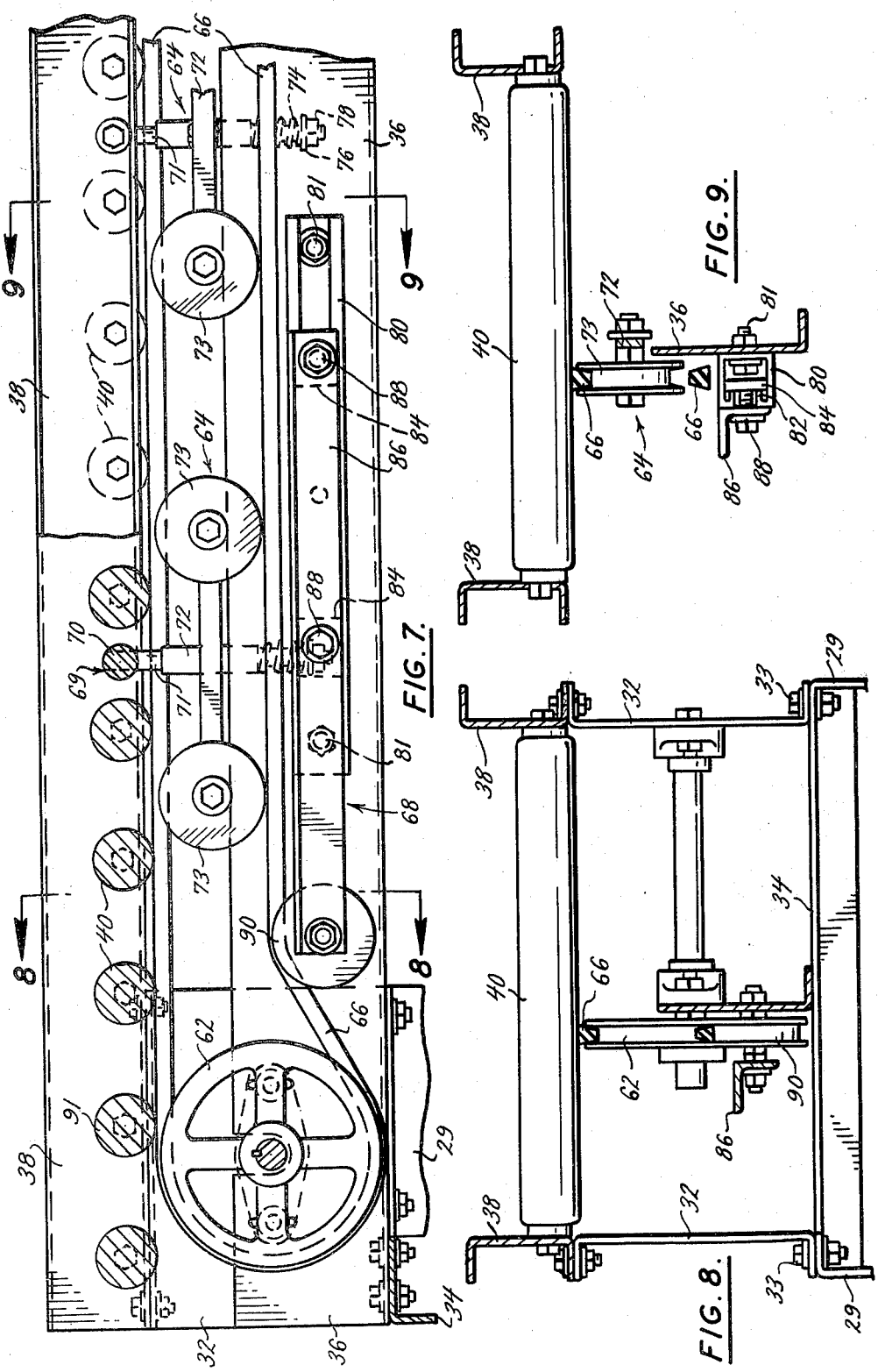

CONVERTIBLE CONVEYOR

BACKGROUND AND SUMMARY

Roller conveyors are well known in the art and may be provided as a gravity conveyor or a powered roller conveyor where power is applied to the rollers to cause them to rotate and convey material along its length. In the prior art, different designs are generally provided by manufacturers of conveyors for each of these different types of applications. A gravity roller conveyor design does not have supporting structure for a motor, pulleys, and gearing between sections of conveyor, Therefore, the amount of steel used in the supporting structure including side frames and supports may be reduced over that in a power conveyor design. In the prior art, at least one manufacturer offers a gravity roller conveyor which may be converted to a powered conveyor by the addition of a packaged power converter including a gear motor and a belt drive which is rather bulky and when mounted to the conveyor, extends out into the aisle. The addition of the power conversion package places an additional load on the gravity roller conveyor and reduces its load carrying capacity. Thus, additional structure must be usually added to support the conveyor for use with the same amount of loading.

With applicant's design, the components for a V-belt drive may be bolted directly onto the existing framework and in the same envelope as the gravity conveyor and thereby maintain most of the load carrying capacity of applicant's gravity conveyor design. By adding the components directly to existing mounting structure in the gravity conveyor design, and by using a V-belt drive, applicant makes it feasible for a manufacturer to have a single design for a gravity roller conveyor and a powered roller conveyor which reduces manufacturing costs, increases the versatility in manufacturing parts and subassemblies, and substantially reduces inventory costs.

In the prior art, one scheme used to drive the rollers in a powered roller conveyor is an endless belt guided by a series of guide rollers or pulleys and held against the surface rollers so that movement of the belt along the guide rollers drives the surface rollers. The belt is typically installed in such a manner that partial disassembly of the guide rollers and supporting structure is required to remove or install a belt. For this reason, the belts are very difficult to change when failure occurs and considerable down time may be experienced. Fixed guide rollers or pulleys and end pulleys are provided which are factory aligned to provide a positive contact between the endless belt, the guide rollers, and the surface rollers which is important in maintaining each of the surface rollers in a driving relationship with the belt and ensuring a smooth continuous flow of product across the conveyor. In some conveyors, intermediate full width guide rollers are provided which pivot only on one side to provide adjustment of tension between the belt and the surface rollers. However, the pivoting of the guide roller on one side has a tendency to skew the belt towards the center of the conveyor. This is undesirable as it places stress on the belt and tends to misalign the driving surface of the belt with the driven surface of the surface rollers. To eliminate this, crude guide posts have been provided in the prior art. These guide posts hold the belt in place by rubbing against the drive belt which increases wearing along the side of the belt. Therefore, a drive belt held in alignment with the surface rollers by the pivotable full length rollers have a tendency to wear rapidly and require constant adjustment to maintain a sufficient driving relationship with the majority of the surface rollers.

Most of the powered roller conveyors in the prior art include some sort of belt tightener to take up the slack which forms in the belt as it wears and ensure positive traction of the belt about the driving pulley or roller. Usually, two or more pulleys are provided and the belt is wound around them in a partial figure eight or the like. One prior art device includes a belt tightener having a pulley which may be mounted in any one of a series of holes spaced from one of the end pulleys. To tighten the drive belt, the belt tightener pulley must be removed from its mounting hole, the belt placed in proper tension and held as the tightener pulley is aligned with the drive belt and simultaneously inserted into a hole. As can be appreciated, it is quite difficult to create the proper tension in the belt at the same time that the pulley is aligned and inserted in one of the mounting holes. Furthermore, this device provides only incremental type of adjustment and it may not be possible to create the desirable tension due to the lack of a hole at the proper location. This can occur frequently as the length of the belt may change with use.

Applicant has succeeded in designing and constructing a conveyor which eliminates many of the problems of the prior art and which provides new features heretofore unavailable. Applicant's basic conveyor includes a straight section of gravity roller conveyor which may be later converted to a powered roller conveyor in the field. The basic structure has adjustable legs and small side frames. A center spine may be provided which extends the length of the conveyor to provide extra strength for those applications requiring the conveyor to carry heavy loads, or where power is added to the conveyor and the loads to be handled are significant enough to require the extra strengthening. Alternately, only center brackets may be provided to later mount the bearings which support a drive shaft and end pulley that are chain coupled or belt coupled to a gear motor output. A mounting plate is also provided for the later addition of a gear motor.

One of the features of applicant's conveyor is a new design for a guide pulley mount which incorporates a bolt-on tee bar mount and a free-riding cross bar support with adjustable tension spring for one or more guide pulleys. Each cross bar mount may be separately adjusted to achieve the desirable tension between its guide pulleys, the drive belt, and the rollers immediately above. This individual adjustment allows for a tension of zero to maximum at any of several places along the length of the conveyor and allowances may thereby be made for differently sized rollers, uneven wear, or other spot problems in the conveyor. The individualized construction also provides for the rapid replacement of any guide pulley or assembly which fails without shutting down the conveyor.

Both the tee bar mount and the cross bar may be canted or angled with respect to the rollers to orient the guide pulleys for use with tapered rollers in curved sections of conveyor. Typically, in the prior art, the tapered rollers have a non-tapered cylindrical section near the inside edge of each roller which contacts the driving belt. However, with applicant's new design guide pulleys and mount, the guide pulleys may be canted so that the endless belt is flush with the bottom angle of the tapered rollers. This reduces the cost for rollers in a curved section by eliminating the requirement of a straight cylindrical section on the rollers and also permits the rollers to be driven near their center. By driving the rollers near their center, less tension is required in the belt to achieve the same transfer of power as there is more belt in contact with each roller. Also, the drive belt obtains greater leverage due to the increased diameter of the roller at the point it is driven and each roller has an increased usable life as there is a greater circumference of roller over which the wearing of the drive belt is dispersed. In other words, the same amount of wear caused by the contact with the drive belt is dispersed over a greater amount of metal present in the larger circumference of the roller nearer its center.

Another new feature of applicant's invention includes a unique belt tightener which is elegantly simple in design but which has significant advantages over the prior art. For example, the belt tightener cooperates with applicant's new guide pulley mount to provide for easy and simple installation or removal of the endless belt in the field as is required to convert from a gravity roller to a powered roller conveyor or vice versa to meet the changing requirements of any installation. In the prior art, removal and replacement of the drive belt generally necessitates substantial disassembly of the guide rollers and their readjustment to ensure proper tension with the surface rollers. Another feature is that adjustment is rapid and provides for independent tension adjustment of each guide pulley mount in a direction perpendicular to that of the belt tightener. Also, applicant's belt tightener provides for infinitely variable adjustment instead of the incremental adjustment supplied by at least one belt tightener in the prior art.

An endless belt may be easily removed or installed from applicant's conveyor by creating slack with the belt tightener, retracting the guide pulley mounts and removal of one "pop-up" roller which is immediately above each fixed end pulley. Thus, the drive belt is not a permanent fixture of the conveyor which requires any significant dismantling before a broken or worn belt may be replaced or to accommodate the conversion from gravity to powered or vice versa.

In sum, applicant's new design conveyor significantly reduces the amount of steel and reinforcing which must be provided for any particular load, is quickly and easily changed in the field from gravity to powered or vice versa, introduces the concept of a center spine to eliminate the heavy and expensive side frames otherwise required, includes a new design for intermediate guide pulley mounts with individual tension adjustment between each set of guide pulleys and the belt and rollers, provides for guide pulleys to be mounted in a canted orientation to accommodate their use with standard tapered rollers in a curved section of conveyor, includes a new design belt tightener which provides for quick and easy removal of the belt without dismantling of the conveyor and which applies a tightening force perpendicular to the tension adjustment of the guide pulleys, all in one basic design conveyor with a minimum number of parts which reduces cost and increases versatility. These and other improvements and features are more fully explained in the drawings and description of the preferred embodiment.

BRIEF DESCRIPTION OF THE DRAWINGS

FIG. 1 is a perspective view of a straight section of conveyor;

FIG. 2 is an end view of the conveyor shown in FIG. 1;

FIG. 5 is a broken cross-sectional view taken along the plane of line 5—5 in FIG. 4 and detailing the tension adjustment of the guide pulleys;

FIG. 6 is a cross-sectional view taken along the plane of line 6—6 in FIG. 5 and further detailing the guide pulleys;

FIG. 7 is a partial cross-sectional view taken along the plane of line 7—7 in FIG. 1 and detailing the belt tightener, guide pulleys and end pulleys;

FIG. 8 is a cross-sectional view taken along the plane of line 8—8 in FIG. 7 and detailing the belt tightener and end pulley;

FIG. 9 is a cross-sectional view taken along the plane of line 9—9 in FIG. 7 and detailing the belt tightener, a guide pulley, and a roller;

DETAILED DESCRIPTION OF THE PREFERRED EMBODIMENT

Figure 10:
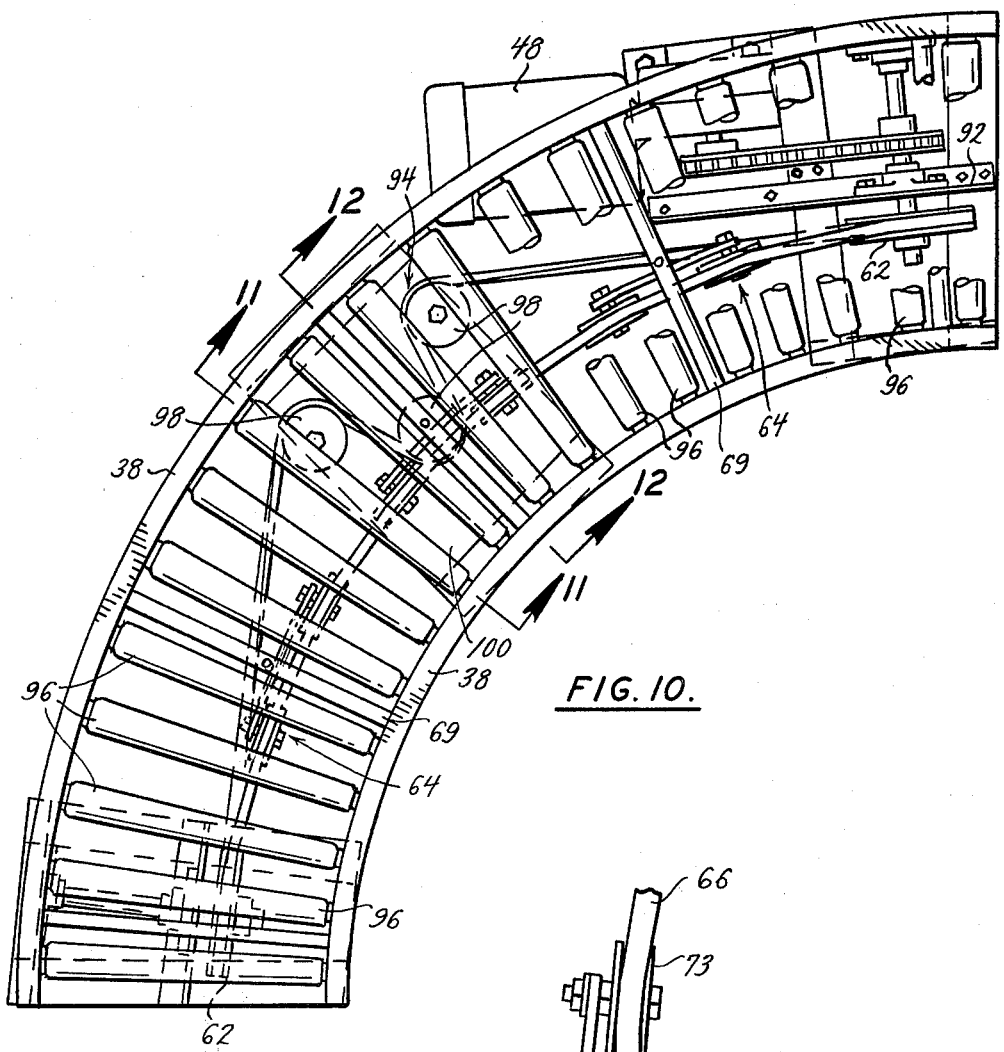
FIG. 10 is a top view of a curved section of conveyor of applicant's design.

Applicant's conveyor 20 is shown in two embodiments, the first embodiment being the straight section depicted in FIGS. 1–9 and the second embodiment being the curved section depicted in FIGS. 10–14. Applicant's first embodiment includes a pair of support legs 22 at each end of the conveyor 20. Each support leg 22 has a foot leveler 24 and mounting plate 26 to provide for installation and leveling of the conveyor 20 on a wide range of surfaces and heights. A pair of cross beams 28 extend between the support legs 22 and provide increased rigidity and support. An adjustment plate 29 is attached by bolts 30 or the like to the top of each support leg 22 and has an adjustment slot 31 which permits support legs 22 to be pivoted with respect to the conveyor 20. A pair of side brackets 32 are mounted by bolts 33 or the like to adjustment plates 29 and end bracket 34 and extends between them to provide a supporting structure for the upper portion of conveyor 20. A center spine 36 is depicted in the drawings for the first embodiment and extends the length of the conveyor between end brackets 34. However, center brackets (as shown in FIG. 10) may be used instead of the center spine 36, if desired. The center spine 36 provides added rigidity and strengthens the conveyor 20 for those applications encountering substantial amounts of loading. Two side frames 38 are preferably bolted to side brackets 32 and extend the length of the conveyor 20. A plurality of rollers 40 are rotatably mounted and extend between side frames 38 and form the conveying surface of conveyor 20.

Figure 3:
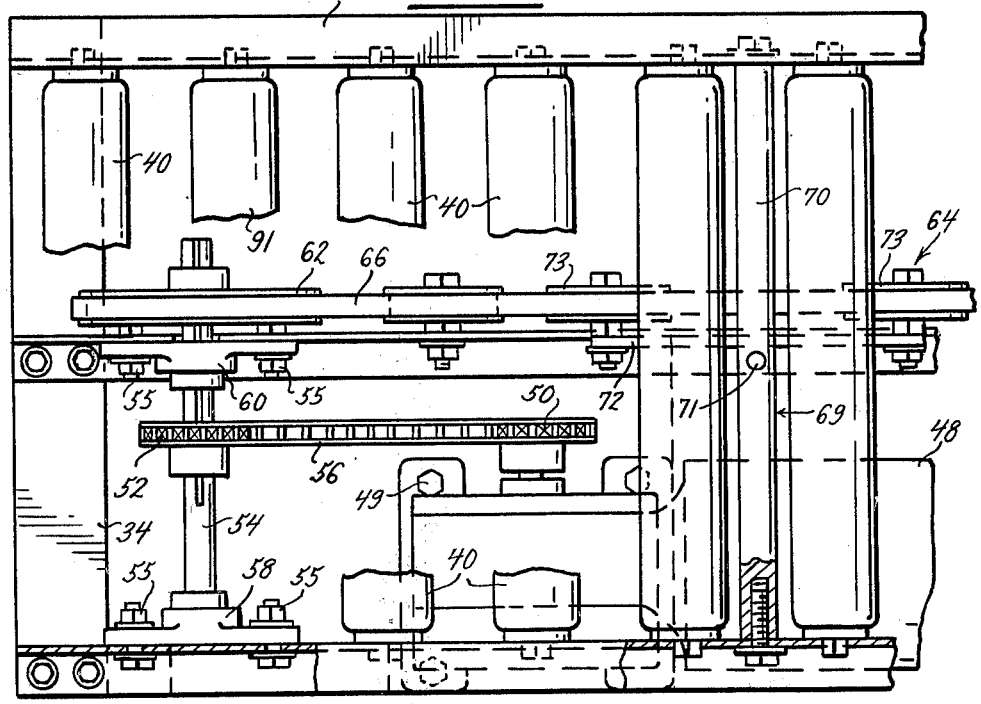
FIG. 3 is an enlarged top view with portions of the rollers broken away to disclose the end pulley and coupling with the motor.
Figure 4:
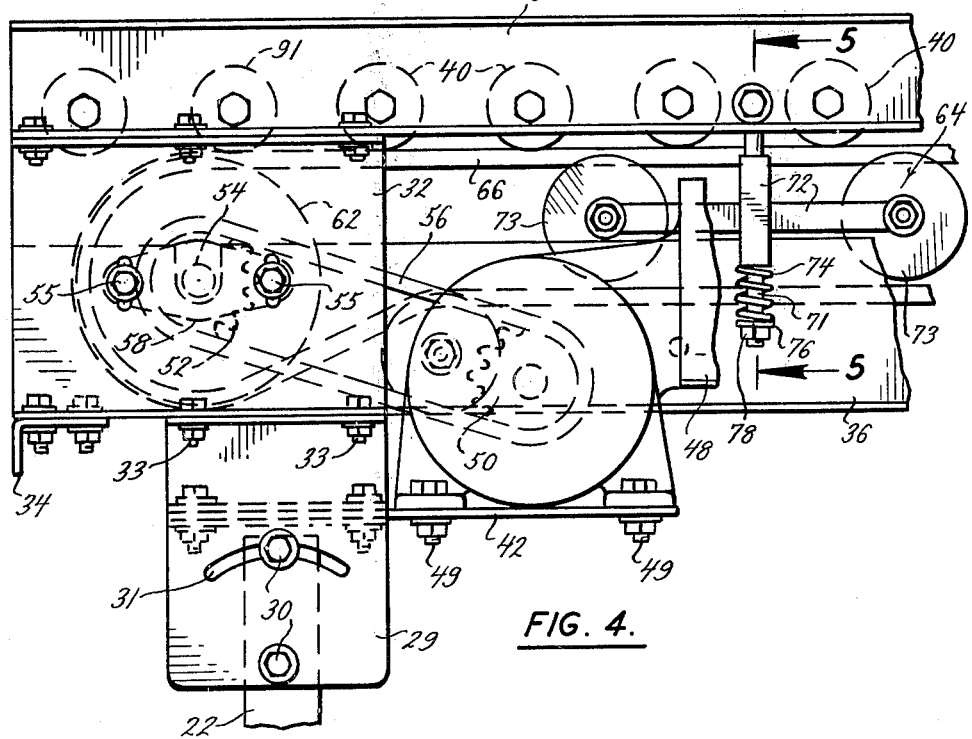
FIG. 4 is a side view of the structure shown in FIG. 3.

The above components comprise a gravity roller section of applicant's conveyor and it is to be understood that those components are the same for either a gravity roller conveyor or a powered conveyor. The following components may be added to applicant's first embodiment of a gravity roller conveyor to convert it from gravity roller to powered. A motor bracket 42, as best shown in FIGS. 2 and 4 is suspended from center spine 36 (or center bracket) and adjustment plate 29 by spacer brackets 44 and 46. Bolts 45 or the like may be used to fasten plate 29 and brackets 44, 46. A gear motor 48 is mounted on motor bracket 42 by bolts 49 and has an output sprocket or pulley 50 coupled to a drive sprocket or pulley 52 on drive shaft 54 by a chain 56 or the like. Drive shaft 54 is rotatably mounted by bearings 58, 60 which are secured by bolts 55 to side bracket 32 and center spine 36 (or center bracket) respectively. An end pulley 62 is mounted to the outside end of drive shaft 54 and is rotatably driven as gear motor 48 drives drive shaft 54 through chain 56. At the opposite end of conveyor 20, a similar drive shaft and end pulley assembly is provided for connection to other sections of conveyor 20 as a gear motor 48 generally has sufficient capacity to drive more than one section of conveyor 20.

Extending between end pulleys 62 is a plurality of guide pulley assemblies 64, an endless belt 66, and a belt tightener 68. These assemblies are best shown in FIG. 7 with details shown in FIGS. 3–9.

The guide pulley assembly 64 include a tee mounting bar 69 which has the upper arm 70 of its tee extending between side frames 38 and the leg 71 of its tee extending downwardly therefrom to align with end pulleys 62. A free-riding cross bar 72 fits over the leg 71 of tee bar 69 and a guide pulley 73 is rotatably secured to each end of cross bar 72. A tension spring 74 is compressed between cross bar 72 and washer 76 by nut 78 which is threaded onto the leg 71 of tee bar 69.

The belt tightener 68 includes a guide bracket 80 which is bolted to center spine 36 by bolts 81 and which has ears 82 extending the length thereof to slidably receive mounting pads 84. Slide bracket 86 is slidably secured to guide bracket 80 by bolts 88 which screw into mounting pads 84. Thus, slide bracket 86 may be moved with respect to guide bracket 80 by loosening bolts 88 and sliding the assembly. Once the desired position is attained, slide bracket 86 may be fixed by tightening bolts 88, bringing mounting pads 84 into contact with ears 82. A pulley 90 is rotatably secured to the end of slide bracket 86 and is sufficiently sized to receive the reverse edge of endless belt 66. Belt tightener 68 may be used to tighten endless belt 66 by merely loosening bolts 88 and moving slide bracket 86 closer to end pulley 62 which increases the wrap of endless belt 66 about end pulley 62 and tends to take up slack in endless belt 66. When the desired amount of slack has been removed from the belt, bolts 88 may then be retightened and the conveyor 20 is ready for operation. Endless belt 66 may thus be tightened by only one man after it has been installed.

The endless belt 66 may be easily removed from conveyor 20 by creating slack with belt tightener 68, retracting guide pulleys 73, and removing two "pop-up" rollers 91. As can be seen from the drawings and from the description above, endless belt 66 wraps around end pulley 62 and rides on guide pulleys 73 to contact rollers 40. All the guide pulleys 73 may be retracted from endless belt 66 by depressing each cross bar 72 against its associated tension spring 74 and belt 66 may then be slid off of each guide pulley 73 and away from rollers 40. End pulleys 62 are fixed in position and therefore a roller 91 immediately above each end pulley 62 must be removed from the conveyor. This is easily accomplished through use of a "pop-up" roller 91 at each of these positions. As is known in the art, these are easily removed by depressing the end of the roller and moving it upwards and out from between side frames 38. Other roller designs which are easily removable may also be used in place of "pop-up" rollers 91. Thus, endless belt 66 may easily be removed by loosening belt tightener 68, removing pop-up rollers 91 in two positions immediately above end pulleys 62, retracting the cross bar 72 for each guide pulley assembly 64, and simply lifting endless belt 66 from around the various pulleys. Installation of an endless belt 66 may be accomplished by simply reversing this procedure.

Figure 11:
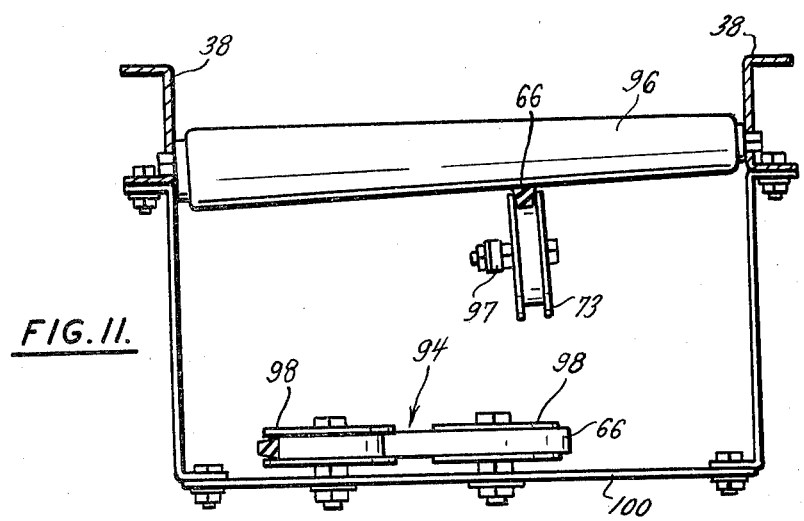
FIG. 11 is a cross-sectional view taken along the plane of line 11—11 in FIG. 10 and detailing the guide pulley and belt tightener pulley configuration.
Figure 12:
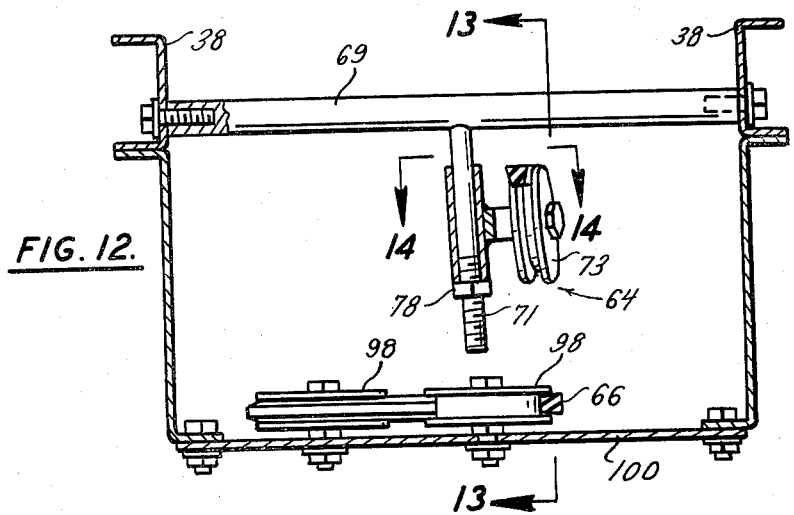
FIG. 12 is a cross-sectional view taken along the plane of line 12—12 in FIG. 10 further detailing the canted mounting of the guide pulley.
Figure 13:
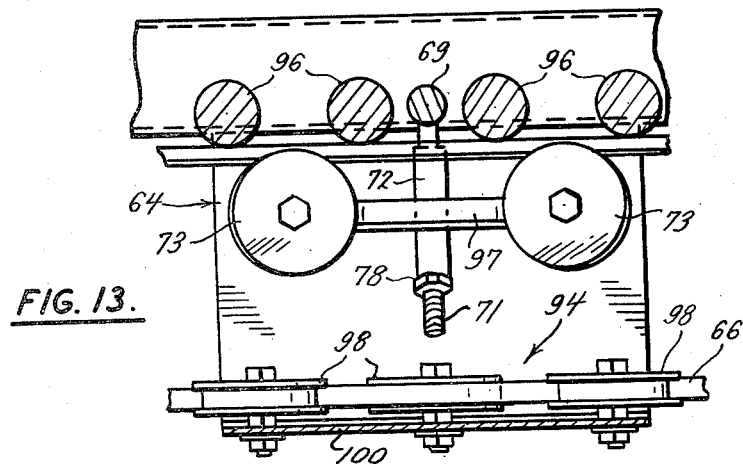
FIG. 13 is a cross-sectional view taken along the plane of line 13—13 in FIG. 12 further detailing the guide pulley mounting.

As shown in FIGS. 10–14, applicants conveyor 20 may also be built into a curved section configuration with all of the same features and advantages of applicant's straight section design plus others which solve problems not present in a straight section. The basic overall construction is substantially the same including the supporting assembly, gear motor 48 and its associated brackets, and the end pulley 62 and drive shaft configuration. Of course, side frames 38 are curved to the desired radius. In the curved configuration, applicant uses center brackets 92 to accommodate the mounting of the drive shaft and end pulley and also a different belt tightener assembly 94 as will be described. As shown in FIG. 11, tapered rollers 96 may be used which are wider at the outer circumference of the curve than at the inner circumference of the curve, as is known in the art. These tapered rollers 96 are mounted to provide a generally flat surface along their upper edges and the angle of the taper is presented at the lower edges of the rollers 96.

Figure 14:
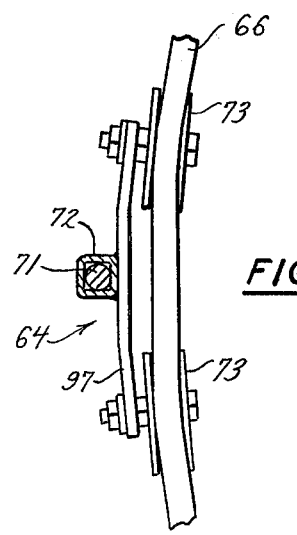
FIG. 14 is a cross-sectional view taken along the plane of line 14—14 in FIG. 12 and further detailing the guide pulley.

As can be appreciated, this presents a problem in that the endless belt 66 usually provides a driving force to these tapered rollers 96 on their bottom edges. Partially tapered rollers as is generally used in the prior art have a cylindrical section near their narrow end and provide a flat section of roller for driving engagement with a drive belt or the like. In order to accommodate a fully tapered roller, applicant's guide pulley assemblies 64 are canted by bending the lower leg of the tee mounting bar 69 towards the inner circumference of the curve. In addition, the cross bar has each end of its horizontal cross member 97 bent slightly closer to the radius of curvature, as is best shown in FIG. 14. These two modifications permit the use of a standard endless belt 66 and a completely tapered roller 96. Furthermore, driving power may be applied to the tapered rollers 96 much closer to their mid-point than is possible in the prior art. To further aid the guide pulleys 73 in holding drive belt 66 in contact with tapered rollers 96, the spring tension adjustment may be eliminated and instead cross bar assembly 64 secured tightly in place with nut 78, which may be self locking. This permits guide pulleys 73 to squeeze drive belt 66 against tapered rollers 96 and prevent its creeping out of pulleys 73.

The belt tightener assembly 94 generally includes three idler pulleys 98 which are adjustably mounted to a bottom plate 100. Any one or more of pulleys 98 may be loosened and moved closer to the others to provide slack and enable the endless belt 66 to be removed from the curved section of conveyor 20.

Changes and modifications would be apparent to one of ordinary skill in the art and are included within the scope of applicant's teaching. Applicant intends that the scope of his invention be limited only by the claims appended hereto.

What is claimed is:

1. A gravity roller conveyor comprising a pair of side frames, a plurality of rollers rotatably mounted between said side frames, and means to convert said conveyor to a power roller conveyor including a mounting plate to receive a motor, a center bracket, said center bracket being disposed between said side frames at an end of said conveyor to receive and rotatably mount a drive shaft and end pulley and means connecting said end pulley and said motor in a driving relationship, means to rotatably mount a second drive shaft and end pulley at the opposite end of said conveyor, means to mount a plurality of guide pulleys between said side frames and extending downwardly between said rollers, means to mount a belt tightener to tighten an endless belt around said end pulleys and guide pulleys so that the endless belt contacts said rollers, said guide pulleys having means to adjust the pressure applied to the belt and said pulleys and tightener having means to permit the rapid installation or removal of said endless belt without disassembly of same.

2. A powered roller conveyor comprising a pair of side frames, a plurality of rollers rotatably mounted between said side frames, a motor mounting plate, a drive motor mounted to said mounting plate, a first center bracket at an end of the conveyor, a first drive shaft and end pulley rotatably mounted to at least one of said side frames and said first center bracket, a second center bracket at the opposite end of the conveyor, a second drive shaft and end pulley rotatably mounted to at least one of said side frames and said second center bracket, a plurality of guide pulleys mounted to said conveyor and substantially aligned with said end pulleys, an endless belt mounted on said end pulleys and guide pulleys, means to adjust the tension between said guide pulleys and said endless belt, means to tigthen said endless belt about said end pulleys and guide pulleys, and means to remove or install said endless belt without removing or dismantling said end pulleys from said conveyor.

3. In a power roller conveyor having a pair of side frames, a plurality of rollers rotatably mounted between said side frames, an endless belt driving the rollers, and a plurality of guides to maintain the belt in contact with the rollers, the improvement comprising means to mount the guides and adjust the pressure applied by the guides to the belt including a shaft extending between the side frames, a post extending downwardly from said shaft, the guides having a cross bar to fit around said post, the cross bar having means to rotatably mount at least one pulley, said endless belt riding in said pulley, a nut threaded onto the end of said post and a spring mounted around said post and extending between said nut and said cross bar so that movement of said nut along the post varies the pressure applied by said spring to said cross bar and by said guides to said belt and said belt may be removed or installed without disassembly of said guide.

4. The device of claim 1 wherein the rollers immediately adjacent the position where said end pulleys are mounted have means to be quickly and easily removed from between said side frames.

5. The device of claim 1 further comprising supports for said side frames, said supports being mounted near the ends of said conveyor, said center bracket extending parallel to said side frames beneath the rollers and connecting said supports to substantially strengthen said conveyor and permit its use with substantially greater loads.

6. The conveyor of claim 1 wherein said side frames are curved with said rollers being tapered and mounted so that their upper edges form a substantially level surface, and wherein the guide pulleys are aligned to mount the drive belt and urge it against the rollers substantially near their midpoint.

7. The device of claim 2 wherein the belt tightening means further comprises a guide bracket fixedly mounted to one of the side frames, a slide bracket with means to selectively re-position and secure said slide bracket to said guide bracket, and a pulley rotatably mounted to an end of said slide bracket and positioned to contact said endless belt so that movement of said slide bracket in a first direction tightens said endless belt about said pulleys and movement of said slide bracket in a second direction loosens said endless belt about said pulleys.

8. A powered roller conveyor comprising a pair of side frames, a plurality of rollers rotatably mounted between said side frames, a motor mounting plate, a drive motor mounted to said mounting plate, a first center bracket at an end of the conveyor, a first drive shaft and end pulley rotatably mounted to at least one of said side frames and said first center bracket, a second center bracket at the opposite end of the conveyor, a second drive shaft and end pulley rotatably mounted to at least one of said side frames and said second center bracket, a plurality of guide pulleys mounted to said conveyor and substantially aligned with said end pulleys, an endless belt mounted on said end pulleys and guide pulleys, means to adjust the tension between said guide pulleys and said endless belt, the means for mounting said guide pulleys and adjusting the tension between said guide pulleys and said belt including a tee bar extending between said side frames, a cross member slidably mounted on the leg of said tee bar, said cross member having means to rotatably mount at least one guide pulley, a nut threaded onto the end of said leg, means to tighten said endless belt about said end pulleys and guide pulleys including a guide bracket fixedly mounted to one of the side frames, a slide bracket with means to selectively reposition and secure said slide bracket to said guide bracket, and a pulley rotatably mounted to an end of said slide bracket and positioned to contact said endless belt so that movement of said slide bracket in a first direction tightens said endless belt about said pulleys and movement of said slide bracket in a second direction loosens said endless belt about said pulleys, and means to remove or install said endless belt without removing or dismantling said end pulleys from said conveyor.

9. The device of claim 8 further comprising a spring mounted around the leg of the tee bar and extending between the nut and the cross member so that movement of the nut along the leg varies the pressure applied by the spring to the cross member and by the guide pulleys to the belt.

10. The device of claim 7 wherein the belt tightener moves in a direction perpendicular to the direction of said tension adjustment of said guide pulleys.

11. A power roller conveyor comprising a pair of side frames, a plurality of rollers rotatably mounted between said side frames, a motor mounting plate, a drive motor mounted to said mounting plate, a first center bracket mounted between said side frames at an end of said conveyor, a first drive shaft and end pulley rotatably mounted and extending between said first center bracket and at least one of said side frames, means providing a driving connection between said motor and said drive shaft so that said drive shaft is rotated by said motor, a second center bracket at the opposite end of said conveyor and disposed between said side frames, a second drive shaft and end pulley rotatably mounted to said second center bracket and at least one of said side frames, said second end pulley being substantially aligned with said first end pulley, a plurality of guide pulley assemblies mounted to said conveyor and substantially aligned with both of said end pulleys, said guide pulley assemblies including a tee bar extending between the side frames with a leg depending therefrom, a cross bar having a guide pulley rotatably mounted to at least one of the arms of said cross bar, a nut threaded onto the end of said leg, and a tension spring extending between said nut and said cross bar so that movement of said nut on said leg changes the force said spring applies to said cross bar, an endless belt mounted around said pulleys including means to tighten said endless belt, said belt tightening means including a guide bracket secured to said conveyor, a slide bracket, a plurality of bolts and mounting pads securing said slide bracket to said guide bracket, a pulley rotatably mounted to an end of said slide bracket, said belt tightener positioned so that movement of said slide bracket along said guide bracket increases the wrap of the endless belt about one of said end pulleys to thereby take up the slack in said belt, and at least one pop-up roller adjacent each end pulley to facilitate the removal or installation of an endless drive belt in said conveyor.

12. The conveyor of claim 11 wherein said side frames are curved, said rollers are tapered and oriented to provide a level conveying surface along their upper edges, and said guide pulley assemblies have means to align said guide pulleys with the curvature of said side frames and the taper of said rollers to ensure a positive engagement between the drive belt and the rollers.

13. A powered roller conveyor comprising a pair of curved side frames, a plurality of tapered rollers rotatably mounted between said side frames so that their upper edges form a substantially level surface, a motor mounting plate, a drive motor mounted to said mounting plate, a first center bracket at an end of the conveyor, a first drive shaft and end pulley rotatably mounted to at least one of said end frames and said first center bracket, a second center bracket at the opposite end of the conveyor, a second drive shaft and end pulley rotatably mounted to at least one of said side frames and said second center bracket, an endless belt mounted on said end pulleys and guide pulleys, a plurality of tee bars extending between said side frames, a cross member mounted on the leg of each of said tee bars, each cross member having means to rotatably mount at least one guide pulley, means to adjust the orientation of said guide pulleys to more closely approximate the curvature of said side frame and the taper of said rollers to enhance the driving engagement between said guide pulleys, drive belt, and tapered rollers, means to adjust the tension between said guide pulleys and said endless belt, means to tighten said endless belt about said end pulleys and guide pulleys, and means to remove or install said endless belt without removing or dismantling said end pulleys from said conveyor.

14. A roller conveyor comprising a pair of side frames, a plurality of rollers rotatably mounted and extending between said side frames, said side frames being curved with said rollers being tapered and mounted so that their upper edges form a substantially level surface, means to mount a drive belt and urge it against the rollers substantially near their mid-point, a support at each end of said conveyor to support said side frames, and a center spine disposed beneath said plurality of rollers, and extending the length of said conveyor between said supports to substantially strengthen and support said conveyor to thereby reduce the required size of said side frames.

* * * * *